United States Patent
Park et al.

(10) Patent No.: US 7,822,920 B2
(45) Date of Patent: Oct. 26, 2010

(54) MASS PREFETCHING METHOD FOR DISK ARRAY

(75) Inventors: Kyu-Ho Park, Chungnam (KR); Sung-Hoon Baek, Daejeon (KR)

(73) Assignee: Korea Advanced Institute of Science and Technology, Daejeon-si (KR)

( * ) Notice: Subject to any disclaimer, the term of this patent is extended or adjusted under 35 U.S.C. 154(b) by 497 days.

(21) Appl. No.: 11/968,370

(22) Filed: Jan. 2, 2008

(65) Prior Publication Data
US 2009/0019260 A1 Jan. 15, 2009

(30) Foreign Application Priority Data
Jul. 13, 2007 (KR) ...................... 10-2007-0070719

(51) Int. Cl.
*G06F 12/00* (2006.01)
(52) U.S. Cl. ...................................... 711/113; 711/137
(58) Field of Classification Search ................. 711/113, 711/137
See application file for complete search history.

(56) References Cited

U.S. PATENT DOCUMENTS

| | | | |
|---|---|---|---|
| 7,386,675 B2 * | 6/2008 | Fachan | 711/137 |
| 7,529,891 B2 * | 5/2009 | Thekkath et al. | 711/137 |
| 2003/0018639 A1 | 1/2003 | Iyengar | |
| 2004/0019745 A1 * | 1/2004 | Espeseth et al. | 711/137 |
| 2004/0215891 A1 * | 10/2004 | Dodson et al. | 711/137 |
| 2005/0138091 A1 | 6/2005 | Bono | |
| 2007/0005905 A1 * | 1/2007 | Yasue et al. | 711/137 |
| 2007/0106849 A1 | 5/2007 | Moore et al. | |

OTHER PUBLICATIONS

Shah et al., Online Algorithms for Prefetching and Caching on Parallel Disks, Jun. 2004, ACM, SPAA'04.*
Binny S. Gill et al.; AMP: Adaptive Multi-stream Prefetching in a Shared Cache; IBM Almaden Research Center; Feb. 13, 2007.
Sung Hoon Baek et al; Massive Stripe Cache and Prefetching for Massive File I/O; Department of Electrical Engineering and Computer Science; Korea Advanced Institute of Science and Technology; Feb. 13, 2007.

* cited by examiner

*Primary Examiner*—Jared I Rutz
(74) *Attorney, Agent, or Firm*—H.C. Park & Associates, PLC

(57) ABSTRACT

Disclosed herein is a mass prefetching method for disk arrays. In order to improve disk read performance for a non-sequential with having spatial locality as well as a sequential read, when a host requests a block to be read, all the blocks of the strip to which the block belongs are read. This is designated as strip prefetching (SP). Throttled Strip Prefetching (TSP), proposed in the present invention, investigates whether SP is beneficial by an online disk simulation, and does not perform SP if it is determined that SP is not beneficial. Since all prefetching operations of TSP are aligned in the strip of the disk array, the disk independence loss is resolved, and thus the performance of disk arrays is improved for concurrent sequential reads of multiple processes. TSP may however suffer from the loss of disk parallelism due to the disk independence of SP for a single sequential read. In order to solve this problem, this invention proposes Massive Stripe Prefetching (MSP). MSP includes an algorithm that detects a single sequential read at the block level. When a single sequential read is detected, prefetching is aligned in a stripe, and the prefetching size is set to a multiple of stripe size. Accordingly, the parallelism of disks is maximized.

10 Claims, 5 Drawing Sheets

MASS PREFETCHING METHOD FOR DISK ARRAY

BACKGROUND OF THE INVENTION

1. Field of the Invention

The present invention relates, in general, to a mass prefetching method for a disk array, which can improve the performance of sequential or non-sequential reads that exhibit spatial locality by using an online disk simulation that investigates whether a prefetching based on strip or stripe of a disk array is beneficial in terms of read service time.

2. Description of the Related Art

Prefetching has been necessitated to reduce or hide the latency between a processor and a main memory as well as between a main memory and a storage subsystem that consists of disks. Some prefetching schemes for processors can be applied to prefetching for disks by means of a slight modification. However, many prefetching techniques that are dedicated to disks have been studied.

The frequently-addressed goal of disk prefetching is to make data available in a cache before the data is consumed; in this way, computational operations are overlapped with the transfer of data from the disk. The other goal is to enhance the disk throughput by aggregating multiple contiguous blocks as a single request. Prefetching schemes for a single disk may give arise to some problems in striped disk arrays. Therefore, there is now a need for a special scheme for multiple disks, in which the characteristics of striped disk arrays must be considered.

Conventional prefetching technologies include offline prefetching, history-based online prefetching, prefetching using hints of application programs, and sequential prefetching. Currently, conventional prefetching schemes except for sequential prefetching are not used in actual systems due to their high overhead and low benefit.

The traditional prefetching schemes ignore the data placement of striped disk arrays and therefore suffer from independency loss for concurrent multiple reads. The prefetching requests of traditional prefetching schemes are not aligned in the strip. Hence, the requests may be split across several disks and then each disk requires much more accesses. We call this problem independency loss. If each prefetching request is dedicated to only one disk, the independency loss is resolved.

If the prefetching size is much less than the stripe size and the number of concurrent sequential reads is much less than the number of the member disks that compose a striped disk array, some of disks become idle, thereby losing parallelism of the disks. This case exemplifies what we call parallelism loss. A large prefetching size laid across multiple disks can prevent the parallelism loss. However, if the independency loss is to be resolved, the prefetching request must be aligned in the strip and its size must be adequate to prevent prefetching wastage. Such a prefetching size is much less than the stripe size, and, as a result, suffers from parallelism loss for a small number of concurrent reads. The two problems, independency loss and parallelism loss, conflict with each other, if problem is resolved, the other problem arises.

SUMMARY OF THE INVENTION

Accordingly, the present invention has been made keeping in mind the above problems occurring in the prior art, and an object of the present invention is to provide a mass prefetching method for striped disk arrays, which uses a new prefetching algorithm capable of solving the problems of the independence loss and the disk parallelism loss, which occur because there is not useful prefetching algorithm for non-sequential reads and the characteristics of disk arrays are not considered.

In accordance with one aspect of the present invention to accomplish the above object, there is provided a mass prefetching method for disk arrays, comprising a first step of a host requesting a disk array controller to read a block; a second step of estimating, using an online disk simulation, a disk cost spent in disk for all blocks of the cache if strip prefetching had always been performed and a disk cost spent in disk without strip prefetching, thus determining whether strip prefetching is profitable for current input/output workload, and a third step of, if the strip prefetching is determined to be profitable, the disk array controller, which controls the disk array, prefetching all blocks of a strip to which the requested block belongs.

In accordance with another aspect of the present invention to accomplish the above object, there is provided a mass prefetching method for a disk array, comprising a first step of a host requesting a disk array controller to read a block, a second step of detecting a single sequential read at the block level, a third step of increasing a Stripe Prefetch Size (SPS) twice if a single sequential read is detected at the second step, and a fourth step of the disk array controller, which controls the disk array, prefetching SPS stripes, thereby performing the perfect parallelism of disks.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
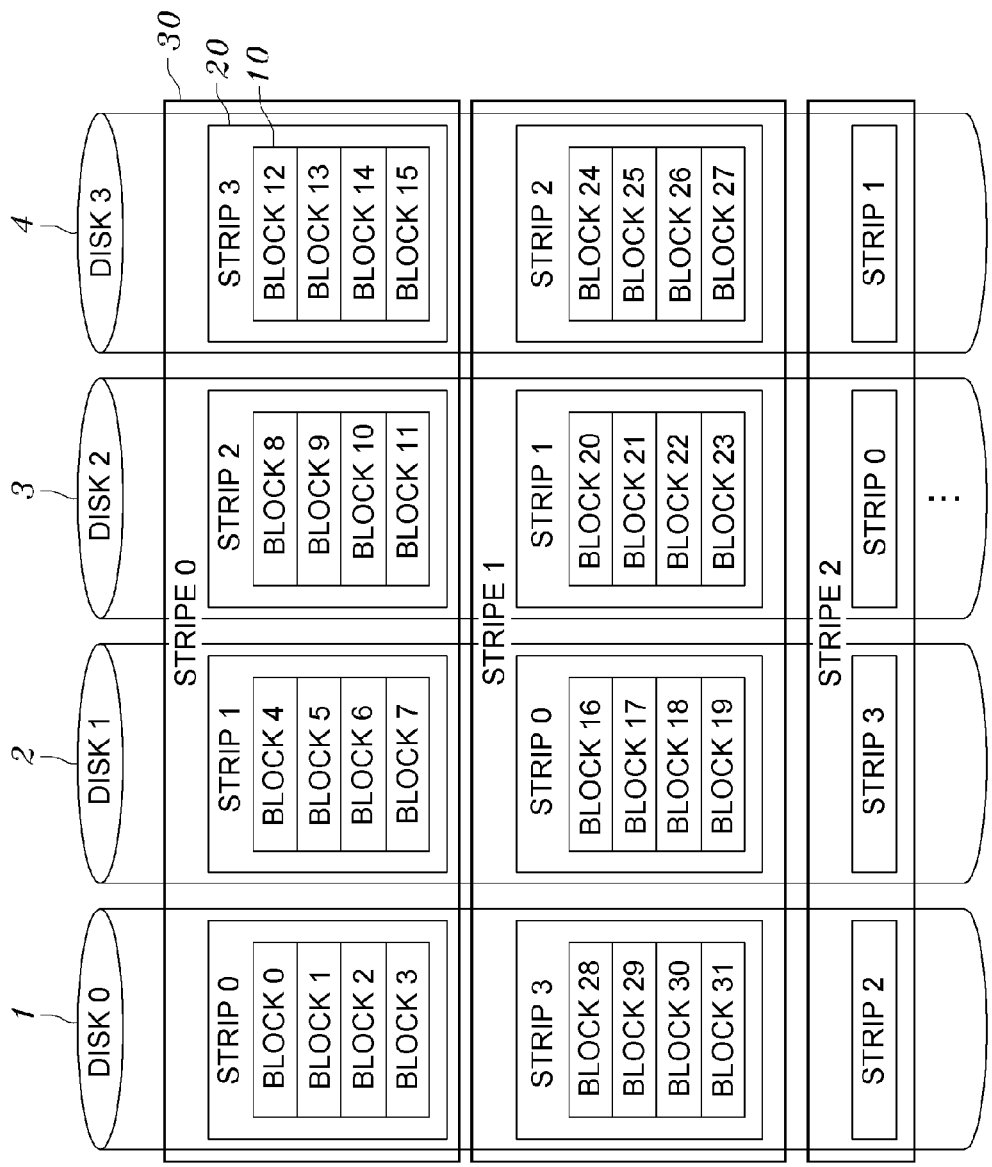
FIG. 1 is a diagram showing an example of a structure of strips and stripes in a disk array composed of four disks.

FIG. 1 is a diagram showing an example of a structure of strips and stripes in a disk array composed of four disks.

Referring to FIG. 1, the disk array consists of four disks 1 to 4. The stripe 30 is divided by the strips 20. Each strip 20 is comprised of a set of contiguous blocks 10 of each disk.

The mass prefetching method for a disk array according to the present invention includes Throttled Strip Prefetching (hereinafter referred to as "TSP") for improving the performance of sequential or non-sequential reads that exhibit spatial locality and solving the problem of the independence loss, and Massive Stripe Prefetching (hereinafter referred to as "MSP") for solving the problem of the parallelism loss.

TSP and MSP can coexist and can be independently used. In particular, when both TSP and MSP are used together, the improvement of performance is maximized.

TSP is an algorithm for activating or deactivating (Strip Prefetching (hereinafter referred to as "SP") using an online disk simulation.

SP is a prefetching method configured such that, when a host requests a block of a disk, a prefetcher reads all blocks of the strip to which the requested block belongs. SP may or may not be beneficial for the current workload.

Therefore, TSP determines, using a disk simulation, whether SP is beneficial for the data stored in the cache.

Figure 2:
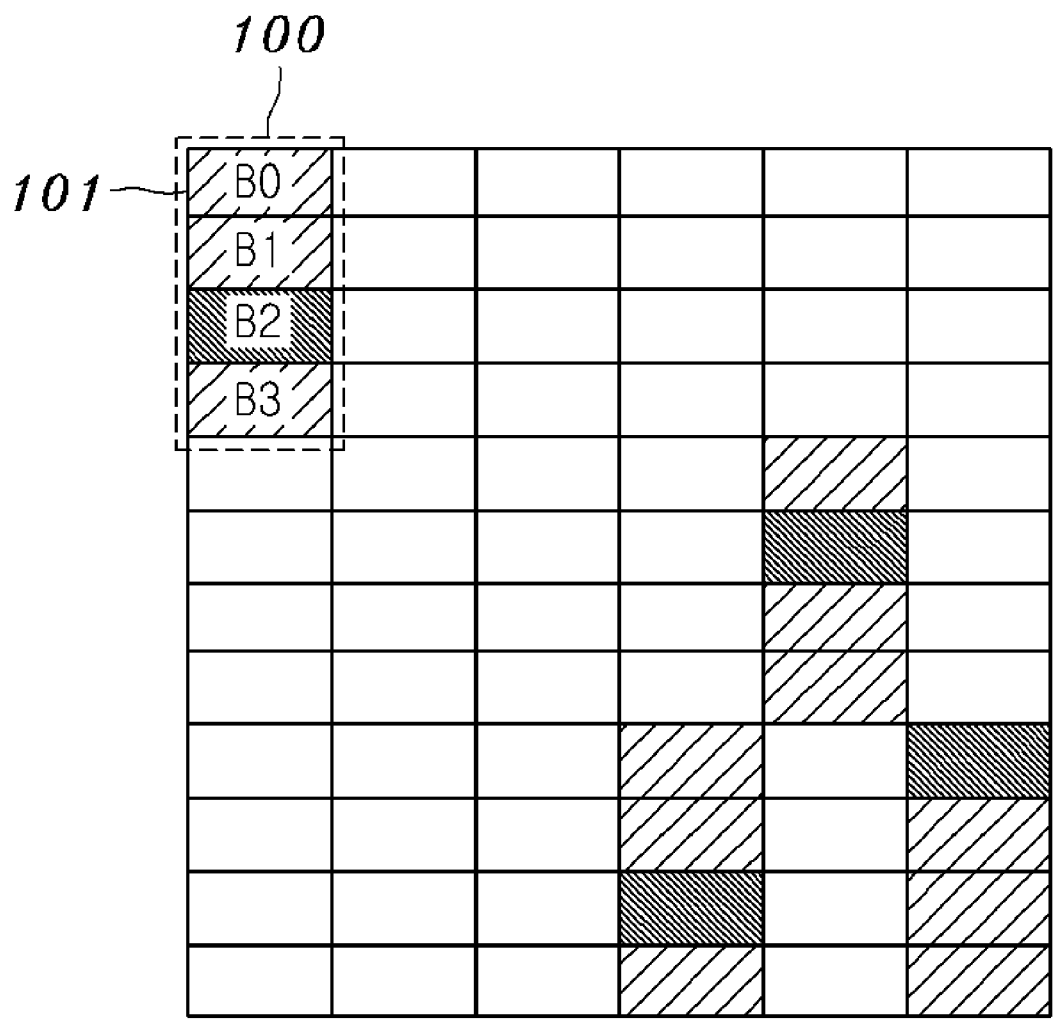
FIG. 2 is a diagram showing blocks and strips at the first step of a non-sequential read.
Figure 2:
Figure 3:
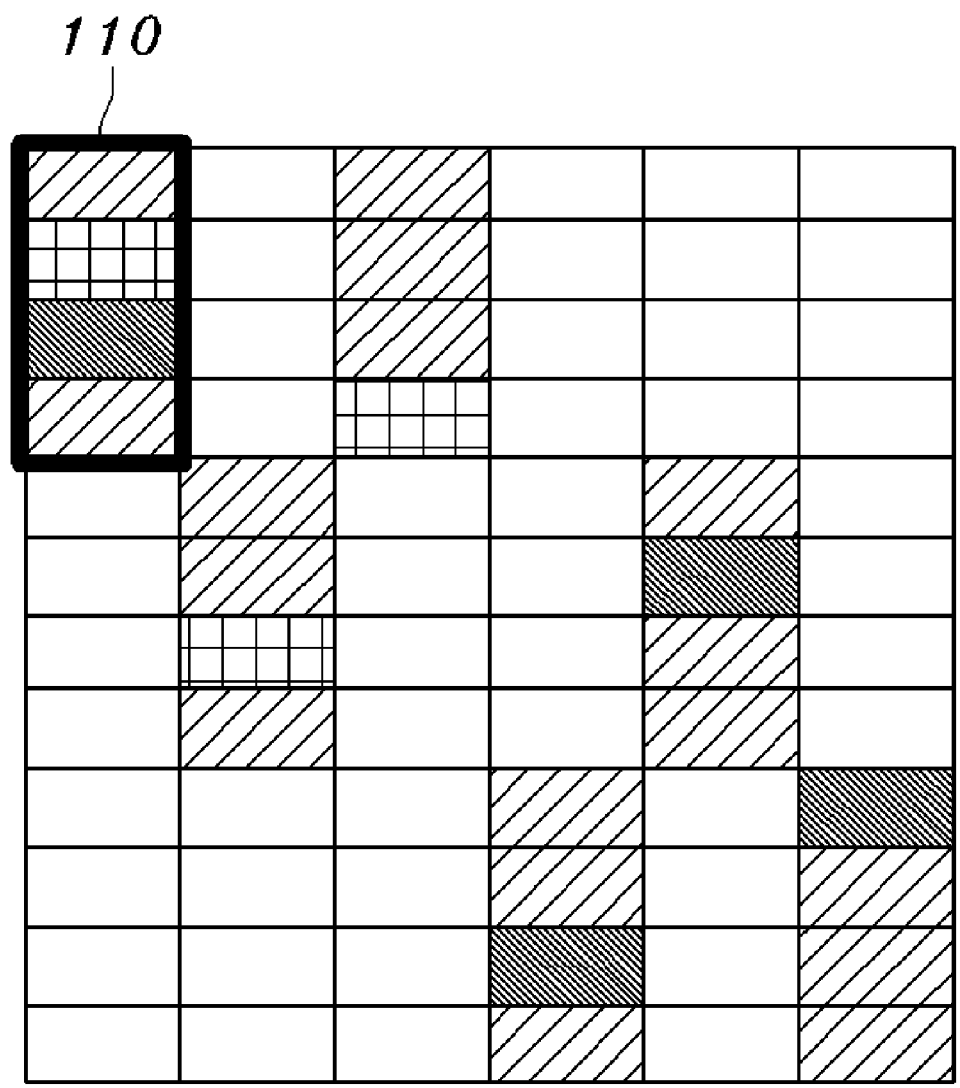
FIG. 3 is a diagram showing blocks and strips at the second step of a non-sequential read.
Figure 3:
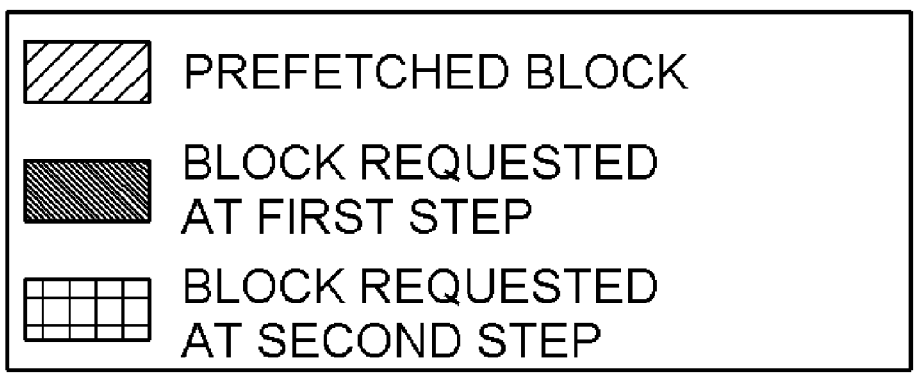
Figure 4:
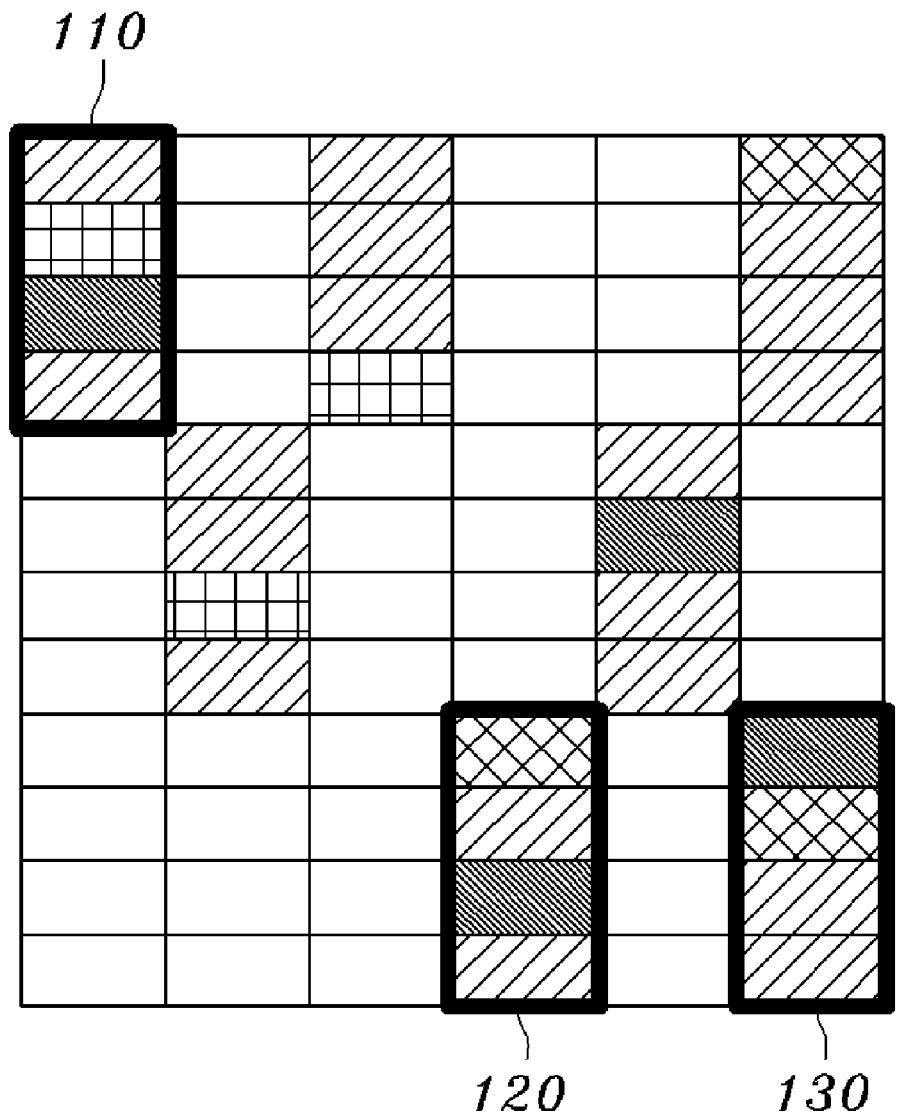
FIG. 4 is a diagram showing blocks and strips at the third step of a non-sequential read.
Figure 4:
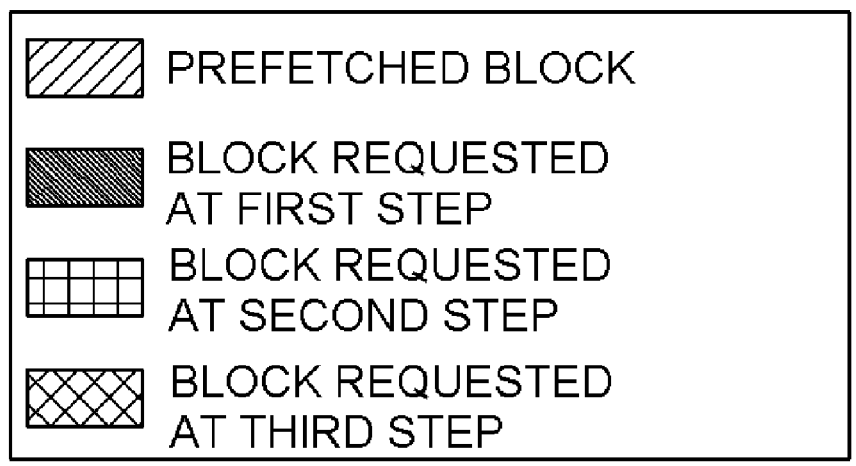

FIGS. 2 to 4 are diagrams showing a storage space when a disk array is represented by a single logical storage device.

Referring to FIGS. 2 to 4, how SP is effective for a non-sequential read with spatial locality is shown. Blocks 101 are basic input/output units for a storage device, and are grouped into strips 100 when the storage device is a disk array.

FIG. 2 is a diagram showing blocks and strips at the first phase of a non-sequential read, and FIG. 3 is a diagram showing blocks and strips at the second phase of a non-sequential read. Referring to FIGS. 2 and 3, at the first phase, blocks are non-sequentially requested, and at the second phase, blocks are also non-sequentially requested, but a single block is prefetched by SP, and a cache hit occurs in the first strip 110.

FIG. 4 is a diagram showing blocks and strips at the third phase of a non-sequential read. Referring to FIG. 4, at the third phase, a cache hit additionally occurs in two blocks belonging to two strips 120 and 130. In the case of the disk, the access time for the requested block is long, but a transfer rate is very high. Accordingly, after the disk accesses the requested block, the additionally reads of several blocks near the requested block have a low overhead. Therefore, in some cases, the amount of time saved by a cache hit may be greater than the overhead occurring when unnecessary blocks are read by SP. However, in other cases, this condition may not be satisfied. Therefore, the TSP of the present invention determines, on the basis of data currently stored in a cache, whether the performance of SP is beneficial.

In TSP, importable variables for this determination are $C_a$ and $C_n$. When $C_a$ is less than $C_n$, TSP activates SP; otherwise it deactivates SP.

Whenever the host requests a block, TSP calculates $C_n$ and $C_a$ by using an online disk simulation with a very low overhead. The disk cost $C_a$ is the read time spent in disk for all blocks for the cache if SP had always been performed. Similarly, the disk cost $C_n$ is the virtual time spent in disk without SP for all blocks of the cache.

Since TSP activates or deactivates SP in real-time, both $C_n$ and $C_a$ are not the actual time spent in disks. Therefore, in order to determine the variables $C_n$ and $C_a$, a disk simulation must be performed. In an embodiment of the present invention, whether the performance of SP is beneficial is based on the variables $C_n$ and $C_a$, as described above. However, in order to further simplify calculation, another embodiment is presented as follows.

First, to reduce the complexity of $C_n$ and $C_a$, $C_n'$ and $C_a'$ are defined. $C_n'$ and $C_a'$ are the disk costs, which, for all strip caches, are calculated as follows by subtracting the latency time (namely the rotational latency, the seek time, and the fixed overhead but not the transfer tome) of the first disk accesses of each strip cache form $C_n$ and $C_a$, respectively.

Accordingly, $C_n'$ and $C_a'$ are defined as the following Equations [1].

$$C_n' = C_n - \sum_{i=1}^{N_s} C_f(S_i)$$

$$= \sum_{i=1}^{N_s} (NoSPcostofS_i - C_f(S_i))$$

$$= \sum_{i=1}^{N_s} C_n^s(S_i)$$

$$C_a' = C_a - \sum_{i=1}^{N_s} C_f(S_i)$$

$$= \sum_{i=1}^{N_s} (SPcostofS_i - C_f(S_i))$$

$$= \sum_{i=1}^{N_s} C_a^s(S_i)$$

Where, $N_s$ is the number of strip caches of the cache, $S_i$ is an i-th strip cache. The first access latency, $C_f(S_i)$, is defined as the access time that is required to initially access a block of a strip cache $S_i$. The access time includes the rotational delay of the disk, the seek time of the head of the disk, and a fixed delay, but excludes the transfer time of the disk. Hence we can eliminate the common part, $C_f(S_i)$, from $C_n'$ and $C_a'$, thereby minimizing the calculation. In other words, $C_a' > C_n'$ if and only if $C_a > C_n$.

$C_n^s(S_i)$ is obtained by subtracting $C_f(S_i)$ from a portion of $C_n$ allocated to $S_i$. Similarly, $C_a^s(S_i)$ is obtained by subtracting $C_f(S_i)$ from a portion of $C_a$ allocated to $S_i$.

Each strip cache has request bits for respective blocks in order to simulate the disk costs of SP and no SP. Only when the host requests a block, the request bit for the requested block becomes '1'; otherwise, it is '0'. Further, the strip cache includes variables $C_n^s(S_i)$ and $C_a^s(S_i)$.

When a block requested by the host does not belong to any strip caches of the current cache, a new strip cache $S_i$ must be allocated. Further, the request bit of the strip cache $S_i$ corresponding to the requested block is set to '1'. Further, the variables $C_n'$, $C_a'$, $C_n^s(S_i)$, and $C_a^s(S_i)$ are updated for $S_i$ using the following operations [2].

newcost=$T_{tr}(S_i)$ $C_n' \leftarrow C_n'$+newcost $C_n^s(S_i) \leftarrow$ newcost $C_a^s(S_i) \leftarrow T_{tr}(S_i) \times$ number of blocks per strip $C_a' \leftarrow C_a' + C_a^s(S_i)$ where $T_{tr}(S_i)$ is the transfer time for one block of strip cache $S_i$. The transfer time is a function of the block offset because the outer zones have higher data transfer rates than the inner zones. For convenience, we assume that all blocks within a strip require the same transfer time. Hence, the transfer time $T_{tr}(S_i)$ can be modeled as the following Equation [3], $$T_{tr}(S_i) = t_{tr}^{min} + (t_{tr}^{max} - t_{tr}^{min}) \times \frac{\text{The first block offset of } S_i}{B_{total}} \quad [3]$$

where $t_{tr}^{max}$ is the maximum transfer time per block, and $t_{tr}^{min}$ is the minimum transfer time per block.

If the memory space is insufficient when a new strip cache is allocated, a specific strip cache must be evicted from the memory. In this case, the following calculation is performed when a strip cache $S_i$ is evicted.

$$C_n' \leftarrow C_n' - C_n^s(S_i)$$

$$C_a' \leftarrow C_a' - C_a^s(S_i) \quad [4]$$

When a block, which was prefetched by SP, but has not been requested by the host, is requested by the host, the request bit corresponding to the block is set to '1', and related variables are set using the following operations [5].

$$\text{newcost} \leftarrow \text{access delay time} + T_{tr}(S_i)$$

$$C_n' \leftarrow C_n' + \text{newcost}$$

$$C_n^s(S_i) \leftarrow C_n^s(S_i) + \text{newcost} \quad [5]$$

Since this case does not correspond to the first access to the strip cache $S_i$, an access delay time, as well as a transfer time, must be calculated using a disk simulator. A simple disk simulator is advantageous in that there is no burden on a processor, and a complicated disk simulator is advantageous in that it can provide a more accurate value. Since the present invention is not particularly concerned with the disk simulator, any disk simulator can be used.

When a block requested by the host is present in the strip cache $S_i$, and the request bit corresponding to the block is '1', the variables $C_n'$, $C_a'$, $C_n^s(S_i)$, and $C_a^s(S_i)$ are not changed.

When the host requests a write, the request bit corresponding to a requested block is set to '1', and the variables $C_n'$, $C_a'$, $C_n^s(S_i)$, and $C_a^s(S_i)$ are not changed.

Next, a prefetching method, in which a cache pollution problem is considered, is described as another embodiment of a mass prefetching method for a disk array according to the present invention.

SP has the problem of cache pollution. Even if disk read performance is improved due to SP, blocks which are not totally used in the future, are read, thus deteriorating the efficiency of use of a cache and decreasing the cache hit rate.

Therefore, TSP ultimately applies a modification to the comparison of $C_a$ with $C_n$ by detecting the degree of cache pollution through disk simulation without controlling SP, merely by comparing $C_a$ with $C_n$.

That is, TSP activates SP when $C_n' - C_h^{diff} > C_a'$, rather than $C_n' > C_a'$, is true, where $C_h^{diff}$ is defined using the following Equation [6], $$C_h^{asp} = C_h \times S_s / N_s$$

$$C_h^{rsp} = C_h \times S_b / N_b \quad [6]$$

$$C_h^{diff} = C_h^{rsp} - C_h^{asp} = C_h \times \left(\frac{S_s}{N_s} - \frac{S_b}{N_b}\right)$$

where $S_s$ and $S_b$ are fixed values, and are respectively defined by the maximum number of strips and the maximum number of blocks that the cache memory can have. $N_s$, $N_b$, and $C_h$ are variables that change in real-time. $N_s$ is the number of strip caches that the cache memory currently has, and $N_b$ is the number of blocks that are currently cached and are requested by the host. $C_h$ is a value obtained through a disk simulator, and is the time-based disk cost currently saved in the cache by a cache hit. $C_h$ is calculated using the following principles.

When a block requested by the host is present in the cache and the request bit of the block is 1, a cache hit is considered to have occurred. At this time, the disk cost for the block is calculated using a disk simulator. The disk cost is added both to the variable $C_h^s(S_i)$ of $S_i$ and to the global variable $C_h$. When a certain strip cache $S_i$ is evicted from the cache, $C_h$ is subtracted from $C_h^s(S_i)$.

In the case of a storage device, such as a Redundant Array of Independent Disks (RAID), the cache memory of the host is physically separated from the cache memory of the RAID, and the former is larger than the latter in many cases. When the same cache replacement algorithm is applied to the host and the RAID, the inclusion property of the cache is satisfied. Accordingly, since the data cached in the storage device must essentially be included in the cache of the host, a cache hit does not occur in the storage device. Then, since $C_h$ is always 0, processing related to cache pollution can be omitted, thus reducing the number of calculations.

As described above, an algorithm for TSP has been described. TSP enables the improvement of the performance of a disk array for a non-sequential read with spatial locality, as well as a sequential read, while guaranteeing the improvement of performance. Since all disk requests are aligned with a single disk, a problem in which the independence of disks is lost is avoided. However, TSP may have a problem in which the parallelism of disks is lost when a single processor performs a single sequential read. In order to solve this problem, a new algorithm called Massive Stripe Prefetching (hereinafter referred to as 'MSP') must be used together with TSP.

MSP is implemented to sense a single sequential read at the block level.

The term 'single sequential read' means that a single process or thread performs a sequential read. When a single sequential read is performed, the prefetch size is smaller than that of a stripe, and thus not all disks operate. Accordingly, the parallelism of disks constituting a disk array may be lost.

When a single sequential read is detected, all prefetching operations are aligned in a stripe and the prefetch size becomes a multiple of the stripe size. As a result, MSP maximizes the read performance of a single stream by performing the perfect parallelism of disks.

In this case, the alignment of the prefetching in a stripe means that the start block address for a prefetching request to the disk is divided by the number of blocks of the stripe without remainder, and that the number of blocks for the prefetching request is divided by the number of blocks of the stripe without remainder.

Figure 5:
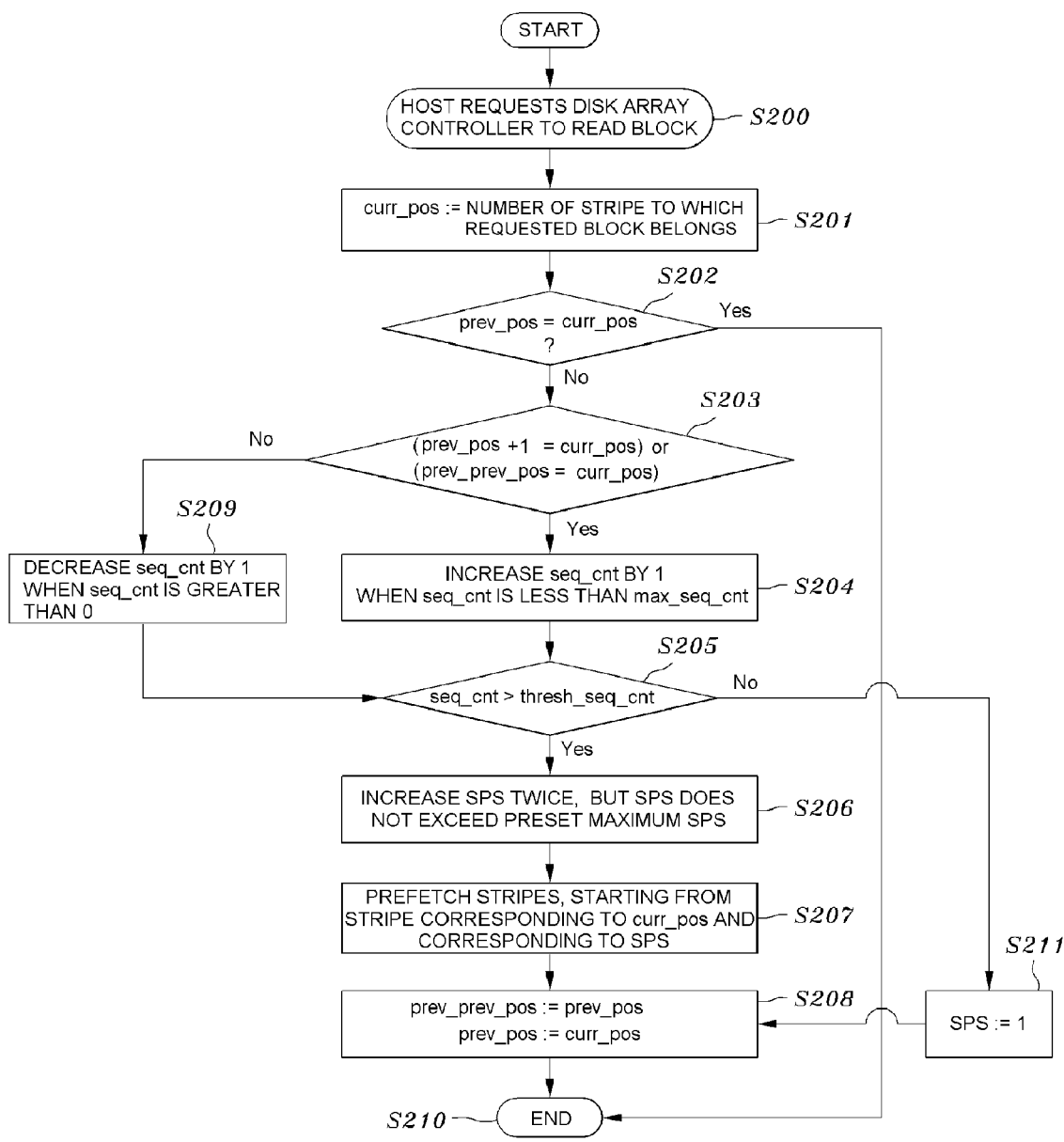
FIG. 5 is a flowchart showing a mass stripe prefetching method, which is one of the mass prefetching methods for a disk array according to the present invention.

The issue of this case is to detect a single sequential read at the block level. Even if a sequential read performs for a single file, reads at the block level require both metadata access and data access throughout in different regions. Hence, sequential reads at the file level is not sequential at the block level. FIG. 5 shows the algorithm of MSP that distinguishes metadata accesses from data accesses at the block level.

FIG. 5 is a flowchart showing mass stripe prefetching, which is one of the mass prefetching methods for a disk array according to the present invention.

Referring to FIG. 5, variables prev_pos, curr_pos, prev_prev_pos, seq_cnt, and SPS are applied to the mass stripe prefetching according to the present invention. Further, predetermined constants thresh_seq_cnt and max_seq_cnt are also used. All of the variables are initially set to '0'.

The variable curr_pos is the stripe number or strip number of the block currently requested by the host. The variable prev_pos is the previous value of curr_pos before curr_pos changes. The variable prev_prev_pos is the previous value of prev_pos before prev_pos changes.

The sequential counter seq_cnt is a variable that increases from 0 to the maximum value max_seq_cnt as a sequential read progresses. Meanwhile, when no sequentiality is detected, the sequential counter decreases. When the sequential counter seq_cnt is greater than a predetermined threshold value thresh_seq_cnt, stripe prefetching is activated.

Further, the variable SPS denotes the number of stripes to be prefetched.

Conceptually, the sequential counter seq_cnt increases or decreases according to the given algorithm. When thresh_seq_cnt<seq_cnt is satisfied, prefetching is performed on a stripe basis, and a stripe prefetch size is increased twice. A detailed description thereof is made below.

First, the host requests a disk array controller to read a block at step S200.

Then, the variable curr_pos has the stripe number to which the requested block belongs at step S201.

Next, curr_pos is compared with prev_pos of a previously requested block to determine whether curr_pos equals prev_pos at step S202. When the condition of the step S202 is true, a single sequentiality inspection is terminated at step S210.

In contrast, when curr_pos is different from prev_pos, whether prev_pos+1=curr_pos or prev_prev_pos=curr_pos is true is determined at step S203.

If prev_pos+1=curr_pos or prev_prev_pos=curr_pos is determined to be true, the sequential counter seq_cnt is increased by 1, but does not exceed the predetermined maximum value max_seq_cnt at step S204.

If prev_pos+1=curr_pos or prev_prev_pos=curr_pos is determined to be false, the sequential count variable is decreased by 1 when it is greater than 0 at step S209.

Further, whether the sequential count variable seq_cnt is greater than the predetermined threshold value thresh_seq_cnt is determined at step S205.

In this case, the predetermined threshold value thresh_seq_cnt is a constant that is greater than 0 and less than the maximum counter max_seq_cnt. When the sequential counter seq_cnt is greater than the threshold value thresh_seq_cnt, the sequentiality is determined to have been detected. For example, the maximum value max_seq_cnt can be set to 8, and the predetermined threshold value thresh_seq_cnt can be set to 5.

When the sequential counter seq_cnt is greater than the threshold value thresh_seq_cnt, the sequentiality is accepted, and thus a stripe prefetching size (SPS) increases exponentially, linearly, or by an increasing function, but does not exceed the preset maximum value of SPS at step S206.

The reason for increasing the stripe prefetching size is that performance is maximized when a prefetch size is at least twice as large as a stripe size in a single sequential read. If a single sequential read is not performed anymore in the future, an excessively large prefetching size results in prefetching wastage. Therefore, it is efficient to cautiously start the prefetch size at 1 when a single sequential read is initially detected, and to gradually increase the prefetch size as the sequential read continuously performs. The case where the maximum stripe prefetch size is 2 or 4 is efficient, but the prefetch size is not limited to this value.

Further, SPS number of stripes starting from curr_pos are prefetched at step S207.

If the sequential counter seq_cnt is equal to or less than the threshold value thresh_seq_cnt, the stripe prefetching size (SPS) is set to 1 at step S211.

Further, prev_prev_pos is updated with the value of prev_pos, and prev_pos is updated with the value of curr_pos at step S208. Thereafter the process is terminated at step S210.

As described above, although the mass prefetching method for a disk array according to the present invention has been described with reference to the attached drawings, the present invention is not limited by the embodiments disclosed in the present specification and drawings, and can be modified without departing from the scope and spirit of the invention as disclosed in the accompanying claims.

The mass prefetching method for disk arrays according to the present invention, having the above construction, is advantageous in that it can improve the performance of disk arrays for a non-sequential read with spatial locality, as well as a sequential read and can solve the problem of the independence loss, and can maximize the parallelism of disks, thus remarkably improving the read performance of both a hardware-based RAID device and a software-based RAID device.

What is claimed is:

1. A mass prefetching method for a disk array, comprising:
   a first step of a host requesting a disk array controller to read a block;
   a second step of calculating, using an online disk simulation, two read costs for strip prefetching and no strip prefetching, thus determining whether strip prefetching is beneficial for current input/output workload by comparing the two read costs; and
   a third step of, if the strip prefetching is determined to be beneficial for the current workload, the disk array controller or driver, which controls the disk array, prefetching all blocks of the strip to which the requested block belongs.

2. The mass prefetching method according to claim 1, wherein the second step activates strip prefetching for the current read request from host if the read cost of strip prefetching is less than the read cost of no strip prefetching, where the read cost of strip prefetching and the read cost of no strip prefetching that are denoted by $C_a$ and $C_n$ respectively are calculated by an online disk simulation as follows: $C_a$ is the read time spent in disk for all the blocks of the cache if SP had always been performed, and $C_n$ is the read time spent in disk for all blocks of the cache if SP had not been performed.

3. The mass prefetching method according to claim 2, wherein the second step is performed such that the strip prefetching is determined to be beneficial when $C_a'$, obtained by eliminating the first access latency, which is required to initially access to all the strips of the current cache, from $C_a$, and $C_n'$, obtained by eliminating the said first access latency from $C_n$, satisfy a relationship $C_a' > C_n'$.

4. The mass prefetching method according to claim 3, wherein $C_a'$ and $C_n'$ are calculated using the following equation:

$$C_n' = C_n - \sum_{i=1}^{N_s} C_f(S_i)$$

$$= \sum_{i=1}^{N_s} C_n^s(S_i)$$

$$C_a' = C_a - \sum_{i=1}^{N_s} C_f(S_i)$$

$$= \sum_{i=1}^{N_s} C_s^a(S_i)$$

where $N_s$ is the number of strip caches, $S_i$ is an i-th strip cache, $C_n^s(S_i)$ is a value obtained by subtracting the first access latency time $C_f(S_i)$, which is required to initially access a block of $S_i$, from a portion of $C_n$ allocated to $S_i$, $C_a{}^s(S_i)$ is a value obtained by subtracting the said first access latency time $C_f(S_i)$ from a portion of $C_a$ allocated to $S_i$, and each strip cache has the request bit for each block and the variables $C_n{}^s(S_i)$ and $C_a{}^s(S_i)$.

5. The mass prefetching method according to claim 4, wherein the second step comprises a step of, if the block requested by the host does not belong to any strip cache present in the current cache, allocating a new strip cache $S_i$, setting a request bit of the new strip cache $S_i$, corresponding to the requested block, to 1, and updating variables for $S_i$ using the following process:

newcost=$T_{tr}(S_i)$ $C_n' \leftarrow C_n'$+newcost $C_n{}^s(S_i) \leftarrow$ newcost $C_a{}^s(S_i) \leftarrow T_{tr}(S_i)\times$ number of blocks per strip $C_a' \leftarrow C_a'+C_a{}^s(S_i)$ where $T_{tr}(S_i)$ is a transfer time for a single block belonging to $S_i$.

6. The mass prefetching method according to claim 4, wherein the second step further comprises a step of, if an strip cache $S_i$ is evicted from the cache, performing the following process:

$C_n' \leftarrow C_n'-C_n{}^s(S_i)$ $C_a' \leftarrow C_a'-C_a{}^s(S_i)$.

7. The mass prefetching method according to claim 4, wherein the second step is performed such that, when a block, which was prefetched by strip prefetching, but has not been requested by the host, is requested by the host, the request bit corresponding to the requested block is set to 1, and the said cost variables are set using the following process:

newcost$\leftarrow$access delay time+$T_{tr}(S_i)$ $C_n' \leftarrow C_n'$+newcost $C_n{}^s(S_i) \leftarrow C_n{}^s(S_i)$+newcost where "access delay time" is the time obtained by subtracting only the transfer time from the time required to read the requested block from the disk.

8. The mass prefetching method according to claim 4, wherein the second step is performed such that, when the block requested by the host is present in the strip cache $S_i$ and a request bit of the block is 1, the variables $C_n'$, $C_a'$, $C_n{}^s(S_i)$, and $C_a{}^s(S_i)$ are not changed.

9. The mass prefetching method according to claim 2, wherein the second step is performed such that the strip prefetching is determined to be profitable when the relationship $C_n'=C_h{}^{diff}>C_a'$ is true in consideration of the performance degradation caused by prefetching pollution, where $C_h{}^{diff}$ is defined using the following equation:

$$C_h^{asp} = C_h \times S_s/N_s$$

$$C_h^{nsp} = C_h \times S_b/N_b$$

$$C_h^{diff} = C_h^{nsp} - C_h^{asp} = C_h \times \left(\frac{S_s}{N_s} - \frac{S_b}{N_b}\right)$$

where $S_s$ and $S_b$ are fixed values and are respectively defined by a maximum number of strips and a maximum number of blocks that the cache can accommodate, $N_s$ is the number of strip caches that the cache currently has, $N_b$ is the number of blocks that are currently cached and are requested by the host, and $C_h$ is a value obtained by a disk simulator and denotes a time-based disk cost currently saved in the current cache by a cache hit.

10. The mass prefetching method according to claim 9, wherein the value $C_h$ is calculated such that, when the block requested by the host is present in the cache and a request bit of the block is 1, a disk cost for the block is calculated using a disk simulator, and is added both to the variable $C_h{}^s(S_i)$ of $S_i$ and to the global variable $C_h$, and, such that, when an arbitrary strip cache $S_i$ is evicted from the cache, the variable $C_h{}^s(S_i)$ is subtracted from $C_h$.

* * * * *